Figure 1:
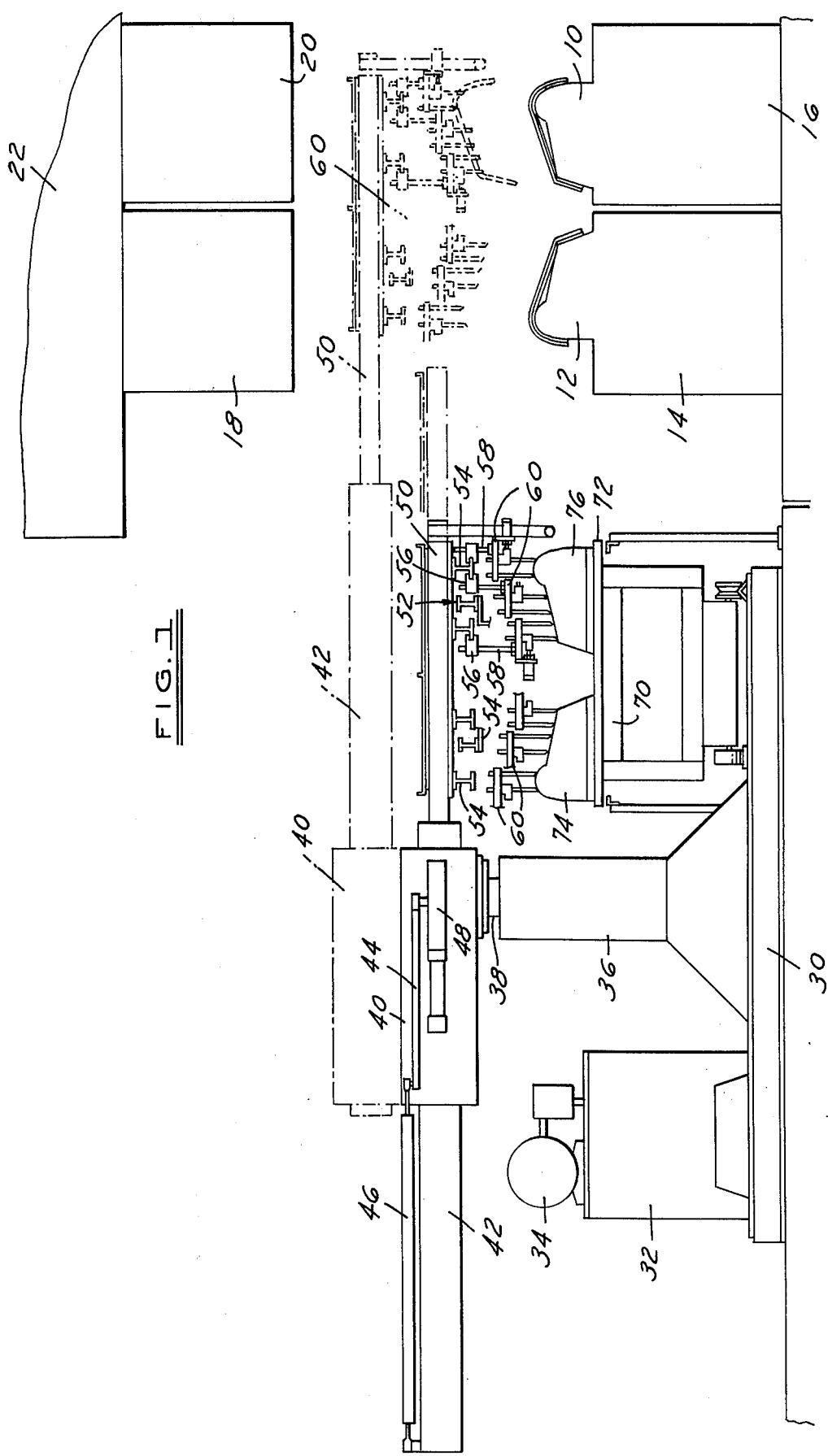

United States Patent [19]

Canner

[11] 4,124,242
[45] Nov. 7, 1978

[54] METHOD AND APPARATUS FOR LOADING PRESSES

[75] Inventor: Herman M. Canner, Detroit, Mich.

[73] Assignee: Sterling Detroit Company, Detroit, Mich.

[21] Appl. No.: 795,179

[22] Filed: May 9, 1977

[51] Int. Cl.² ............................................. B29D 9/00
[52] U.S. Cl. ................................ 294/61; 214/1 BB; 214/6 R; 214/8; 221/214; 264/258; 271/18; 271/18.3; 425/403.1; 425/453
[58] Field of Search ............... 264/154, 155, 258, 259, 264/271, 291; 214/1 BB, 6 R, 8; 294/61, 120, 86 R; 271/18.3, 33, 18; 425/403.1, 453; 221/213-216

[56] References Cited

U.S. PATENT DOCUMENTS

| 3,176,979 | 4/1965 | Engelman | 271/18.3 |
| 3,326,592 | 6/1967 | Pelton | 294/61 |
| 4,015,872 | 4/1977 | Loznak et al. | 294/61 |

FOREIGN PATENT DOCUMENTS 977,119  12/1964  United Kingdom ...................... 294/61

Primary Examiner—Willard E. Hoag
Attorney, Agent, or Firm—Barnes, Kisselle, Raisch & Choate

[57] ABSTRACT

A method and apparatus for loading forming dies with a mold blanket which comprises providing a lay-up station with simulated die forms outside the forming dies where the mold blanket material may be distributed as it will be in the die and providing a pick-up assembly composed of a plurality of pins distributed around the blanket which pins are pressed in to perforate the blanket and certain of the pins are moved transversely to others to tension the blanket whereby the blanket may be lifted bodily, moved into a die press, and dropped on to the forming dies prior to the pressing cycle.

2 Claims, 5 Drawing Figures

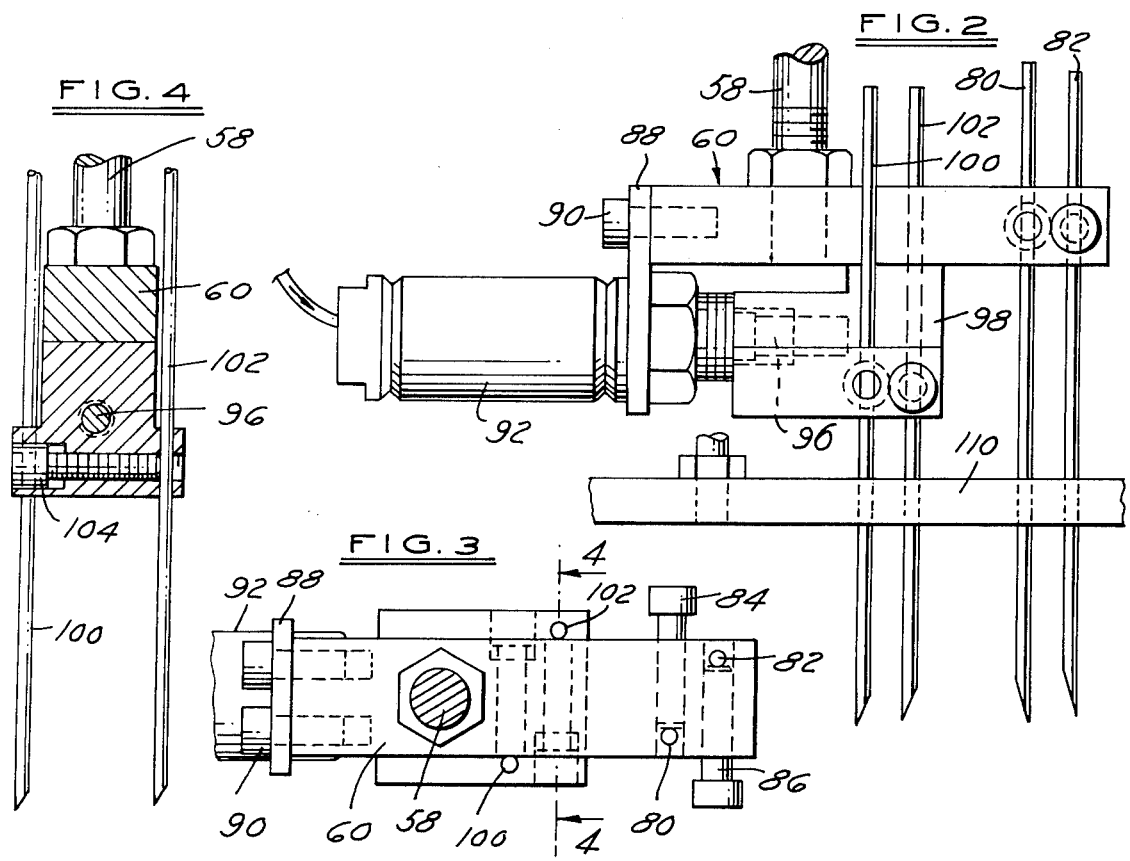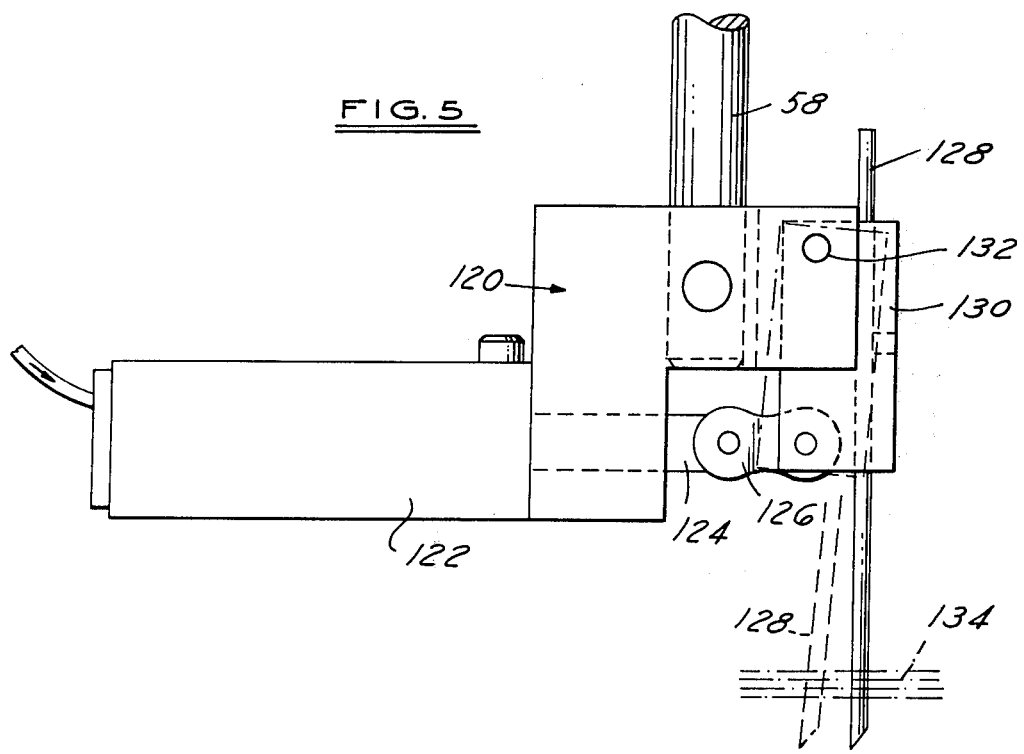

ial are fairly large and some of them are sufficiently heavy and bulky that two men are required in the unloading of a press. Since the press is sometimes a walk-in type of machine, there are many safety problems in a manual loading and unloading.

METHOD AND APPARATUS FOR LOADING PRESSES

This invention relates to a method and apparatus for loading presses and is more particularly related to a system useful in the production of large plastic moldings by what is called the compression molding process.

Many industrial parts, including those for automobiles, are molded from what is called sheet molding compound, namely, a blanket of fibers impregnated with a thermosetting material protected by a polyethylene sheet on each side and rolled to preserve the freshness of the material prior to subjection to heat and pressure. Many of the parts that are formed from this sheet material are fairly large and some of them are sufficiently heavy and bulky that two men are required in the unloading of a press. Since the press is sometimes a walk-in type of machine, there are many safety problems in a manual loading and unloading.

In many cases, the lay-up of the material is accomplished by utilizing several limp, flaccid pieces which must be overlaid and properly positioned in the mold. It has been found advantageous to provide a mock-up of the mold outside the press so that the rather limp, flimsy blanket material may be laid up outside the press after which it is transferred into the press onto the mold. In this way, the material is initially laid up in about the same form as it will take in the press, and this has been found advantageous not only from the point of view of the time saved, but also with respect to the quality of the final product. Sometimes these molds are five or six feet in width and eight to ten feet in length and the curing is done under pressures of sometimes close to 1,000 tons with the cure time of 1½ to 3 minutes. Because of this, it is desirable to cut down the load time as much as possible.

One of the problems in connection with the advance lay-up in the simulated mold table is transferring from this table to the mold inside the press.

The present invention contemplates a pick-up device for the pre-lay-up material which will transfer it from the lay-up table to the press mold in a relatively short period of time and without disturbing the general contours and arrangement of the lay-up material.

Briefly, this is accomplished by providing a pick-up plate which can be moved over the lay-up table and which has specially designed, adjustable fingers which will penetrate the blanket material and tension the material sufficiently to allow pick-up without injury to the material, making it possible to transfer the lay-up blanket into the mold and release it to overlie the press mold prior to the application of heat and pressure.

The system then involves a plurality of penetrating pins which will be positioned adjustably, vertically and horizontally, so that they may be readily adapted to varying contours and which may be easily operated to create the pick-up tension and to relieve the tension when the blanket material is dropped in place.

Various details of the disclosure will be apparent in the following description and claims in which the invention is described and the mechanism for the application of the invention is set forth and directed to persons skilled in the art in connection with the best mode presently contemplated for the practice of the invention.

DRAWINGS accompany the disclosure and the various views thereof may be briefly described as:

FIG. 1, a side view of a composite machine to utilize the invention.

FIG. 2, a detail side view of a pick-up assembly.

FIG. 3, a top view of the pick-up assembly shown in FIG. 2.

FIG. 4, a sectional view on line 4—4 of FIG. 3.

FIG. 5, a side view of a modified pick-up assembly.

WITH REFERENCE TO THE DRAWINGS

A side view of a machine is shown in FIG. 1 wherein a forming press is illustrated at the right-hand side of the drawing with the forming molds 10 and 12 mounted on suitable base blocks 14 and 16. The upper mold elements are shown diagramatically at 18 and 20 mounted on a press element 22 which will be brought down to meet the bottom elements of the mold to apply the necessary pressure and heat for curing. This is a known type of process and apparatus.

The loading mechanism shown at the left of the drawing includes a base 30 with a suitable hydraulic power unit 32 and 34 to provide hydraulic fluid pressure for operating the elements of the system. A hydraulic ram assembly 36 is vertically disposed to lift a ram shaft 38 on which is mounted a power block 40 which will raise and lower with the ram shaft 38. Slidably mounted in the power block 40 is a horizontal projector tube 42 which can be advanced to the right as viewed in the drawing to the dotted position shown. This is accomplished by a harmonic drive in the form of links 44 and 46 pivotally connected and driven by a suitable rack and gear cylinder 48.

An extension tube 50 slidably mounted at the right-hand end of the projector tube 42 carries a lay-up fixture assembly indicated generally at 52, this assembly carrying a number of horizontally disposed supports 54 arranged at different levels. Each of these supports can carry a block 56 supporting a vertically adjustable rod 58, each rod carrying a horizontal pin support block 60. These supports 54 and blocks 56 are distributed throughout an area which will generally overlie the area covered by the molds 10 and 12. A lay-up form is provided in the form of a table arrangement 70 suitably disposed below the fixture assembly 52. On the top plate 72 of this table are lay-up forms 74 and 76 which are substantially identical to the mold forms 10 and 12 in the press.

As shown in FIG. 2, the pin support block 60 mounted on the vertically adjustable rods 58 carries a pair of vertically disposed pins 80 and 82 locked in position by headed screws 84 and 86. A bracket plate 88 on the left-hand end of the pin block 60 held by headed screws 90 carries a fluid actuated cylinder 92, the support being through a nut 94. This cylinder has a piston rod 96 projecting therefrom which carries a slide block 98, this block having a sliding relationship with the pin block 60 and carrying two vertically disposed pins 100 and 102. These pins are again mounted by headed screws 104 and can serve as a guide for the slide block 98 relative to the pin block 60.

IN THE OPERATION of the device, the ram 36 is actuated to raise the ram shaft 38 and the power block 40 to the position shown in dot-dash lines in FIG. 1. In this position, the plastic lay-up material in the form of limp uncured sheets can be draped over the mold forms 74 and 76 to cover the entire form with suitable trim areas extending beyond the form as necessary.

The ram is then lowered to the position shown in solid lines in FIG. 1 so that the pins 80-82 and 100-102 penetrate the lay-up blanket which overlies the forms. At this point, fluid is introduced into the piston cylinder combination 92 which is a spring return type of device and this causes the pins 100 and 102 to move transversely to their axes relative to the pins 80, 82. The degree of movement here may be ¼ inch to ⅜ inch depending on the type of material being handled. This, it will be seen, will tension the material between the stationary and the moving pins and cause the material to be gripped by the pins.

At this point in the operation, the ram shaft 38 is again raised to the position shown in the dot-dash lines of FIG. 1 and the harmonic projection of the projector tube 42 is initiated by the power cylinder 48. At the same time, the tube 50 can be also pneumatically or hydraulically projected from the tube 42 so that the mounting fixture assembly 52 is positioned over the mold blocks 10 and 12 as shown in the dotted lines. The ram shaft 38 can again be lowered to position the lay-up blankets over the molds 10 and 12 and fluid actuation of the piston cylinder assembly 92 deactivated so that the pins 80 and 82 and 100 and 102 return to their initial spacing position. This relieves the tension on the lay-up blanket and allows it to drop onto the molds 10 and 12.

If desired, a stripping plate 110 can be mounted below the pins so that as the fixture assembly is raised, the blanket will be positively stripped from the pins. The loading assembly fixture is then retracted by the tubes 42 and 50 so that the die heads 18 and 20 may be brought down to apply the pressure and introduce the necessary heat to cure the formed blanket on the molds. After this is accomplished and the die is re-opened, the formed parts may be removed and the process repeated.

In FIG. 5, a modified type of system is shown in which the vertically adjustable rods 58 carry an L-shaped block 120 which has a piston cylinder assembly 122 mounted thereon with a rod 124 connected to a link 126. One or more pins 128 is mounted in a pivoted block 130 supported by a pivot 132 and connected to the link 126. This permits actuation of the cylinder 122 which will cause the pin 128 to shift angularly relative to its initial position to tension the blanket 134 relative to other stationary pins 80, 82 which are supported from the assembly fixture. Thus, the same tensioning is achieved in a different mechanical embodiment. The operation utilizing this type of pin motion would be the same as previously described in connection with FIGS. 1 to 4.

Suitable safety devices would be incorporated into the machine so that the die head 122 could not move downwardly until the loading apparatus was retracted. It will be seen that this type of system permits manual lay-up in an area which is outside the press and it is never necessary then for the operators to enter the press where a malfunction might cause serious injury. Suitable mechanical unloading devices can be utilized for preparing the press for a second and additional cycles.

What I claim is:

1. A device for moving a sheet of penetrable flacid material from a lay-up position to a position on a mold which comprises:
   (a) a frame,
   (b) a plurality of horizontally spaced support means each mounted on said frame for vertical adjustment relative to a horizontal plane,
   (c) a plurality of straight, smooth pins all mounted vertically on said respective support means in parallel relation to each other,
   (d) means for moving said frame and support means vertically in a direction parallel to said respective pins into a position penetrating a sheet to be moved,
   (e) means for shifting a plurality of said pins angularly relative to others of said pins;
   (f) and means to shift said frame laterally from a pick-up position to loading position over a mold, said rods being vertically adjustable so they may be readily adapted to varying mold contours.

2. A device for moving a sheet of penetrable flacid material from a lay-up position to a position on a mold which comprises:
   (a) a frame,
   (b) a plurality of horizontally spaced support means each mounted on said frame for vertical adjustment relative to a horizontal plane,
   (c) a plurality of straight, smooth pins all mounted vertically on said respective support means in parallel relation to each other,
   (d) means for moving said frame and support means vertically in a direction parallel to said respective pins into a position penetrating a sheet to be moved,
   (e) means for shifting a plurality of said pins relative to others of said pins in a direction transverse to the axis of said pins, and
   (f) means to shift said frame laterally from a pick-up position to a loading position over a mold, said support means including a mounting block, means to mount one or more pins on said mounting block, a slide block on and underneath said mounting block, means to mount one or more pins on said slide block in substantially parallel relation to the pins on said mounting block, and means to move said slide block relative to said mounting block to cause said pins to move transversely relative to each other, while maintaining their parallel relationship, said slide block having mounted thereon two pins having portions mounted to overlie the sides of the mounting block and having a sliding relation with respect to said mounting block to guide the slide block in its motion relative to the mounting block.

* * * * *